Sept. 20, 1966 S. PESSOK 3,274,460

CONTROLLED RECTIFIER COMPRISING A RESISTIVE PLATING INTERCONNECTING ADJACENT N AND P LAYERS

Filed July 27, 1962

INVENTOR.
STANLEY PESSOK

BY James and Franklin

ATTORNEYS

3,274,460
CONTROLLED RECTIFIER COMPRISING A RESISTIVE PLATING INTERCONNECTING ADJACENT N AND P LAYERS

Stanley Pessok, West Orange, N.J., assignor to General Instrument Corporation, Newark, N.J., a corporation of New Jersey Filed July 27, 1962, Ser. No. 212,974
5 Claims. (Cl. 317—235)

This invention relates to solid state rectifiers, and more particularly to so-called "controlled rectifiers."

Silicon diodes have been used as power rectifiers. It is already known to provide a third terminal which acts as a gate terminal to control the operation of the rectifier. When the gate is off, there is no flow or output. When the gate is on there is a rectified or half-wave output, thus affording control of the operation of the rectifier. Moreover, because the control is electronic it may be operated at very high frequency, for example, by means of a high frequency wave which is synchronous with that which is being rectified, in which case the gate may be used to time portions of the half-waves, so that only a desired part instead of all of the half-waves are passed through the rectifier.

To make such a controlled rectifier, it is already known to diffuse (or alloy) both surfaces of N type silicon (or other semiconductor metal) to provide layers of P type semiconductor, one of which is later connected to an anode terminal. The outer surface of the other P zone is diffused over much, but not all of its surface to give the surface N type characteristics, for later connection to a cathode terminal. The remainder of the P surface later receives a gate terminal. The silicon surface is plated with nickel and then with gold, preparatory to soldering, and a gap is left in this plating between the N and P portions, in order not to short circuit the same, which would be a short circuit across the cathode and gate terminals.

The general object of the present invention is to improve the operation of such controlled rectifiers. I have found that this may be done by using a resistive connection between the adjacent N and P portions, and more particularly by carrying the plating over from one portion to another for a very limited distance, in order to provide the desired resistive connection. The exact theory underlying the ensuing operation is not fully understood, and the present discovery therefore may be considered to be empirical.

To accomplish the foregoing general object, and other more specific objects which will hereinafter appear, my invention resides in the controlled rectifier elements and their relation one to another, as are hereinafter more particularly described in the following specification. The specification is accompanied by a drawing in which.

Figure 1:
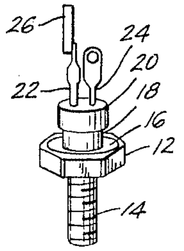
FIG. 1 is a perspective view showing a controlled rectifier embodying the invention.

Referring to the drawing, and more particularly to FIG. 1, the power rectifier there shown is a silicon controlled rectifier, the housing of which includes a hexagonal or nut-shaped portion 12 with an integral threaded stud 14, later used for mounting the rectifier in equipment, and also used as a terminal, usually the anode terminal of the rectifier. The flat portion 16 and cylindrical portion 18 are made of metal, and the part 18 is closed by a glass seal 20 through which operates a main cathode lead or terminal 22, and a gate lead or terminal 24. The part 26 has a relatively large hole, and the part 24 a relatively small hole for connection purposes. The metal parts 16 and 12 are welded together with a hermetic seal.

Figure 2:
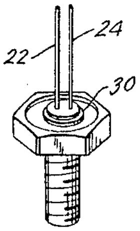
FIG. 2 is a similar view, with the upper part of the housing removed.

Referring now to FIG. 2, when the upper part of the housing has not yet been applied the semiconductor is exposed at 30. Its top surface is divided, the larger portion receiving a cathode terminal lead 22, and the smaller portion receiving a gate lead 24. These leads may be slender, but for physical strength, the external leads shown in FIG. 1 are heavy and rigid. They are tubular, and are sealed in glass at 20 before the top is applied. The internal leads 22, 24 are received in the tubular posts; the periphery of part 16 is welded to part 12; and the tubular posts are compressed or flattened against the inside leads above the glass seal.

Figure 4:
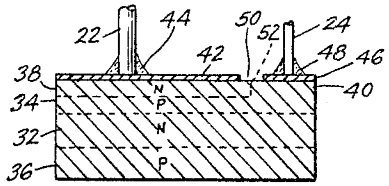
FIG. 4 is a section taken in the plane of the line 4—4 of FIG. 3 and also of FIG. 5.

Referring now to FIG. 4, the silicon junction is a four layer device made up of an N layer 32 between P layers 34 and 36. Much, but not all, of the P layer is surmounted or converted to an N layer 38. The anode terminal, not shown, is connected to the P layer 36. The cathode terminal 22 is soldered to the N layer 38, and the gate terminal 24 is soldered to the remaining portion 40 of the P layer.

One way of making these connections is by soldering. Because of the difficulty in soldering to silicon, and because of the limited kinds of metal which may be plated on silicon, the current practice is to plate silicon with nickel, which adheres to silicon, and then with gold which adheres to nickel, and to then solder to the gold plating. Other metals may be siutable, for eaxmple, rhodium or chromium. In the present case the plating 42 receives solder indicated at 44, and the plating 46 receives solder indicated at 48. There is a gap 50 between the two portions 42 and 46, in order not to short circuit the N portion 38 to the P portion 40, or, what amounts to the same thing, in order not to short circuit between the cathode terminal 22 and the gate terminal 24. The plated areas 42 and 46 with a gap 50 therebetween are also clearly shown in FIG. 3, which represents the prior art construction used without the present invention. The dotted line 52 symbolizes the division between the N portion and P portion at the top surface of the multiple layer junction.

The theory of the operation of the controlled rectifier, usually advanced, is that the PNP junction is the same as a PNNP junction, which would be two rectifiers arranged back-to-back, and therefore blocking any output. The N layer 38 tends to supply electrons to fill the holes in the P layer 34, but only inadequately. A positive potential applied to gate terminal 24 attracts a copious flow of electrons through the N layer and into and throughout the P layer 34, filling the holes, and thereby converting it, in effect, to additional thickness of N layer, so that the junction then becomes a simple two-layer NP junction. Thus, whenever a gate potential is applied to the gate lead 24, the rectifier is operative, and when the gate potential is not applied, the rectifier is inoperative.

Figure 8:
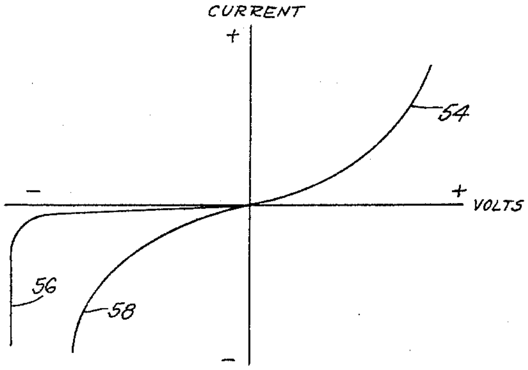
FIG. 8 shows a characteristic curve which is explanatory of the invention.

It should be noted that the N portion 38 and P portion 40 themselves constitute an ancillary diode within the structure. I have found that the operation of the controlled rectifier is adversely affected by this ancillary diode, and that the operation of the controlled rectifier is greatly improved if the said ancillary diode 38, 40 is a poor one instead of a good one. Referring to FIG. 8 a good diode has a characteristic curve represented by the parts 54, 56, there being virtually no back-flow or leakage current. A poor diode may have a characteristic curve represented by the parts 54 and 58, with very substantial back-flow or leakage current. This characteristic is obtainable by a resistive connection across the ancillary diode.

Sometimes it is desirable not to have any ancillary diode characteristic at all, but unfortunately, the other requirements of the controlled rectifier necessitate the existence of the diode parts 38, 40. It is not feasible to simply short circuit these, but it is feasible to provide a resistive path which, on the one hand, is not so low in resistance as to lose the gate control which is being sought, and which, on the other hand, is low enough to remove or eliminate much of the undesired diode effect. A resistance of say 20 to 100 ohms is satisfactory for the present 16 ampere unit.

Figure 3:
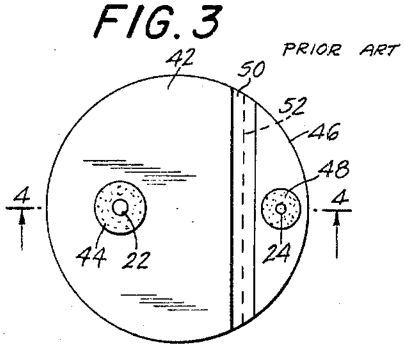
FIG. 3 is a plan view drawn to larger scale, and showing the separation heretofore used between the N and P areas.
Figure 5:
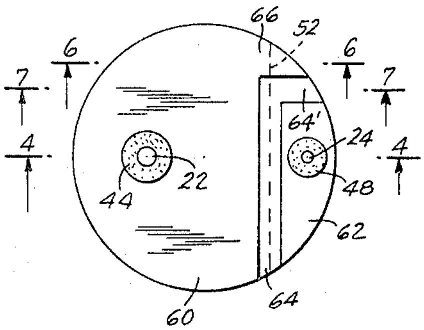
FIG. 5 is a plan view similar to FIG. 3, but showing my improved construction.

In terms of FIGS. 3 and 4, I have found that the operation of the controlled rectifier may be greatly improved by the provision of a resistive connection between the N and P layers 38 and 40, or what amounts to the same thing, between the cathode and gate leads 22 and 24 but preferably within the rectifier housing. I have further found that a highly dependable way to provide such a resistive connection, of fixed value, is to carry the plating over from one portion to the other for a limited width. This is illustrated in FIG. 5, in which the plating 60 over the N portion is separated from the plating 62 over the P portion by a gap 64, much as before, except at one point, in this case at the point 66, where the plating is carried over from one portion to the other, thereby providing a resistive connection between the two portions. The dotted line 52 represents the boundary between the N and P portion portions, which is the same as before, and the leads 22 and 24 are applied the same as before.

Figure 6:
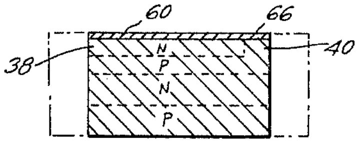
FIG. 6 is a section taken approximately on the line 6—6 of FIG. 5.

To help further illustrate the structure, reference may be made to FIG. 6 which shows how, on the section line 6—6, the plating 60 is carried directly to and over the P portion 40 by means of the plated area 66. At this section the plating is continuous over the top of the junction.

Figure 7:
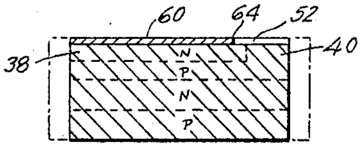
FIG. 7 is a section taken approximately on the line 7—7 of FIG. 5.

FIG. 7 is a section taken in the plane of the line 7—7 of FIG. 5, and shows how the plating 60 terminates at 64 ahead of the line of demarcation 52, between the N and P portions 38 and 40.

The controlled rectifier illustrated is a high power rectifier which carries 16 amperes at 500 volts. The voltage is not significant for the present purpose, and may vary over a very wide range. In any case the quantitative values given in this description are solely by way of example, and are not intended to be in limitation of the invention. The unit is hermetically sealed in a welded package. The leads are Kovar matched in a glass seal, enabling the unit to withstand wide temperature range and temperature shock.

The junction is formed by triple diffusion. Silicon material of N type is diffused to change both sides to P type silicon. The portion coresponding to 40 in FIGS. 3 and 4 is then masked, and the remainder is diffused to convert the surface to N type silicon, thereby providing the layer 38. The gaps 64, 64', shown in FIG. 5, formed by masking when adding the nickel and gold plating, which then covers the areas 60 and 62, shown in FIG. 5.

It is seen from FIG. 5 that the electrical path between the cathode lead 22 and gate lead 24 includes the plated layers, the underlying silicon, and the gap 64, 64'. The geometrical and the electrical relationships among these are important. The resistivity of the plated layer is important, and this in turn will depend on the density and the thickness of the plating. The plating at 66 in FIG. 5 acts as a bridge which provides a resistive connection between the N and P layers 38 and 40, which improves the operation by partially eliminating the rectification or diode characteristic as between the parts 38 and 40. The resistive path referred to might be located between the terminals outside the rectifier housing, but there are important advantages to the internal location here provided, which is protected against damage or change.

In the present unit the width of the plating-free zone or barrier 60, 62, that is the width of the separation band 64, 64', is about 1/32 of an inch. The width of the cross-over path at 66 (FIG. 5) and the plating thickness are so related as to provide the desired resistance of 20 to 100 ohms.

It is believed that the construction and operation of my improved controlled rectifier, as well as the advantages thereof, will be apparent from the foregoing detailed description. All of the important and desirable characteristics of the known controlled rectifiers are retained, including its ability to function instantaneously, so that it may be operated at high frequency, when desired, to limit or gate portions of every half-cycle, of even a radio frequency wave that is being rectified. In addition, the operation, and particularly the dependability and production or manufacturing uniformity of such rectifiers are greatly enhanced by the provision of the resistive path described above.

In theory the polarity is reversible, that is, starting at the bottom the layers of silicon might be N, P, N, P type, in which case the threaded stud or terminal at the bottom would be a cathode; the terminal 22 at the top would be an anode; and the gate voltage would be negative instead of positive. However, it is greatly preferred to arrange the polarity as here shown.

In FIG. 5 the line 52 is shown straight, and the gap 64, 64' is shown L-shaped, but it will be understood that the same result may be obtained by making the junction line 52 L-shaped and the gap 64 straight. Other configurations may be employed to provide the desired gap, while having a part of the plating on the cathode portion carried over from the cathode portion to the gate portion.

It will be understood that while I have shown and described my invention in a preferred form, changes may be made in the structure shown, without departing from the scope of the invention as sought to be defined in the following claims. In the claims the reference to N and P and cathode and anode are to be considered relative, and are not intended to exclude a structure with reversed polarity, as mentioned in the preceding paragraphs.

I claim:

1. A controlled power rectifier comprising a silicon semiconductor having P, N and P layers, an anode terminal on one side, a cathode terminal lead and a gate terminal lead on the other side, a diffused N layer on the cathode side covering a substantial portion less than all of the P layer surface, metal plating for soldering of the cathode terminal lead on the N surface portion, metal plating for soldering of the gate lead on the P surface portion, there being a gap in the metal plating between the said N and P surface portions, the plating at one point of limited area being carried over the said gap from one portion to the other providing a resistive connection between the two portions.

2. A controlled power rectifier comprising a semiconductor having P, N and P layers, an anode terminal on one side, a cathode terminal lead and a gate terminal lead on the other side, a diffused N layer on the cathode side covering a substantial portion less than all of the P layer surface, metal plating on the N surface portion receiving the cathode lead, metal plating on the gate surface portion receiving the gate lead, a gap in the metal plating between the said cathode and gate portions, the junction line between the said cathode and gate portions and the gap in the metal plating being differently shaped, one being straight and the other being L-shaped, whereby at one point of limited area the plating on the cathode portion is carried over from the cathode portion to the gate portion.

3. A controlled power rectifier comprising a silicon semiconductor having P, N and P layers, an anode terminal on one side, a cathode terminal lead and a gate terminal lead on the other side, a diffused N layer on the cathode side covering a substantial portion less than all of the P layer surface, metal plating on the N surface portion receiving the cathode lead, metal plating on the gate surface portion receiving the gate lead, a gap in the metal plating between the said cathode and gate portions, the junction line between the said cathode and gate portions and the gap in the metal plating being differently shaped, one being straight and the other being L-shaped, whereby at one point of limited area the plating on the cathode portion is carried over from the cathode portion to the gate portion to provide a resistive connection therebetween.

4. A controlled power rectifier comprising a semiconductor having P, N and P layers, an anode terminal on one side, a cathode terminal lead and a gate terminal lead on the other side, a diffused N layer on the cathode side covering a substantial portion less than all of the P layer surface, metal plating on the N surface portion receiving the cathode lead, metal plating on the gate surface portion receiving the gate lead, a gap in the metal plating between the said cathode and gate portions, the junction line between the said cathode and gate portions being straight, and the gap in the metal plating being L-shaped, whereby at one point of limited area the plating on the cathode portion is carried over from the cathode portion to the gate portion.

5. A controlled power rectifier comprising a silicon semiconductor having P, N and P layers, an anode terminal on one side, a cathode terminal lead and a gate terminal lead on the other side, a diffused N layer on the cathode side covering a substantial portion less than all of the P layer surface, metal plating on the N surface portion receiving the cathode lead, metal plating on the gate surface portion receiving the gate lead, a gap in the metal plating between the said cathode and gate portions, the junction line between the said cathode and gate portions being straight, and the gap in the metal plating being L-shaped, whereby at one point of limited area the plating on the cathode portion is carried over from the cathode portion to the gate portion to provide a resistive connection therebetween.

References Cited by the Examiner

UNITED STATES PATENTS

| | | | |
|---|---|---|---|
| 2,751,528 | 6/1956 | Burton | 317—234 |
| 2,887,628 | 5/1959 | Zierdt | 317—235 |
| 2,921,244 | 1/1960 | Emeis | 317—234 |
| 2,971,139 | 2/1961 | Noyce | 317—235 |
| 2,993,154 | 7/1961 | Goldey et al. | 317—235 |
| 3,090,873 | 5/1963 | Mackintosh | 307—88.5 |
| 3,109,983 | 11/1963 | Cooper et al. | 317—101 |

JOHN W. HUCKERT, *Primary Examiner.*

J. D. KALLAM, *Assistant Examiner.*